United States Patent [19]

Totsune et al.

[11] 4,335,699
[45] Jun. 22, 1982

[54] EXHAUST GAS RECIRCULATION SYSTEM

[75] Inventors: Atsushi Totsune, Houya; Yasuhito Itoh, Asaka; Hitoshi Yamabe, Ohi, all of Japan

[73] Assignee: Honda Giken Kogyo Kabushiki Kaisha, Tokyo, Japan

[21] Appl. No.: 185,300

[22] Filed: Sep. 8, 1980

[30] Foreign Application Priority Data

Sep. 10, 1979 [JP] Japan .................... 54-115144

[51] Int. Cl.³ ............................................. F02M 25/06
[52] U.S. Cl. .................................. 123/568; 123/571; 123/585; 123/587; 123/588
[58] Field of Search ............... 123/568, 571, 569, 585, 123/586, 587, 588

[56] References Cited

U.S. PATENT DOCUMENTS

| 4,050,429 | 9/1977 | Yasuhiro et al. | 123/568 |
|---|---|---|---|
| 4,106,464 | 8/1978 | Yamashita et al. | 123/571 |
| 4,171,688 | 10/1979 | Takahashi | 123/568 |
| 4,180,033 | 12/1979 | Aoyama | 123/568 |
| 4,187,811 | 2/1980 | Katoh et al. | 123/568 |
| 4,235,207 | 11/1980 | Nishimura | 123/568 |
| 4,242,998 | 1/1981 | Shioya et al. | 123/568 |
| 4,257,382 | 3/1981 | Matsui et al. | 123/578 |
| 4,304,210 | 12/1981 | Hayakawa | 123/572 |

FOREIGN PATENT DOCUMENTS 1486651 9/1977 United Kingdom .

Primary Examiner—Wendell E. Burns
Attorney, Agent, or Firm—Lyon & Lyon

[57] ABSTRACT

Apparatus for controlling exhaust gas recirculation in an internal combustion engine employs a first control valve in an exhaust gas recirculation passageway, a second control valve in an air conduit connecting the intake passage to atmosphere through selective restriction means, and a regulating valve responsive to differential vacuum intensities for actuating the control valves. The restriction means comprise a plurality of individual restrictions one or more of which are selectively put into operation depending upon engine operating parameters such as coolant temperature and driving speed.

7 Claims, 1 Drawing Figure

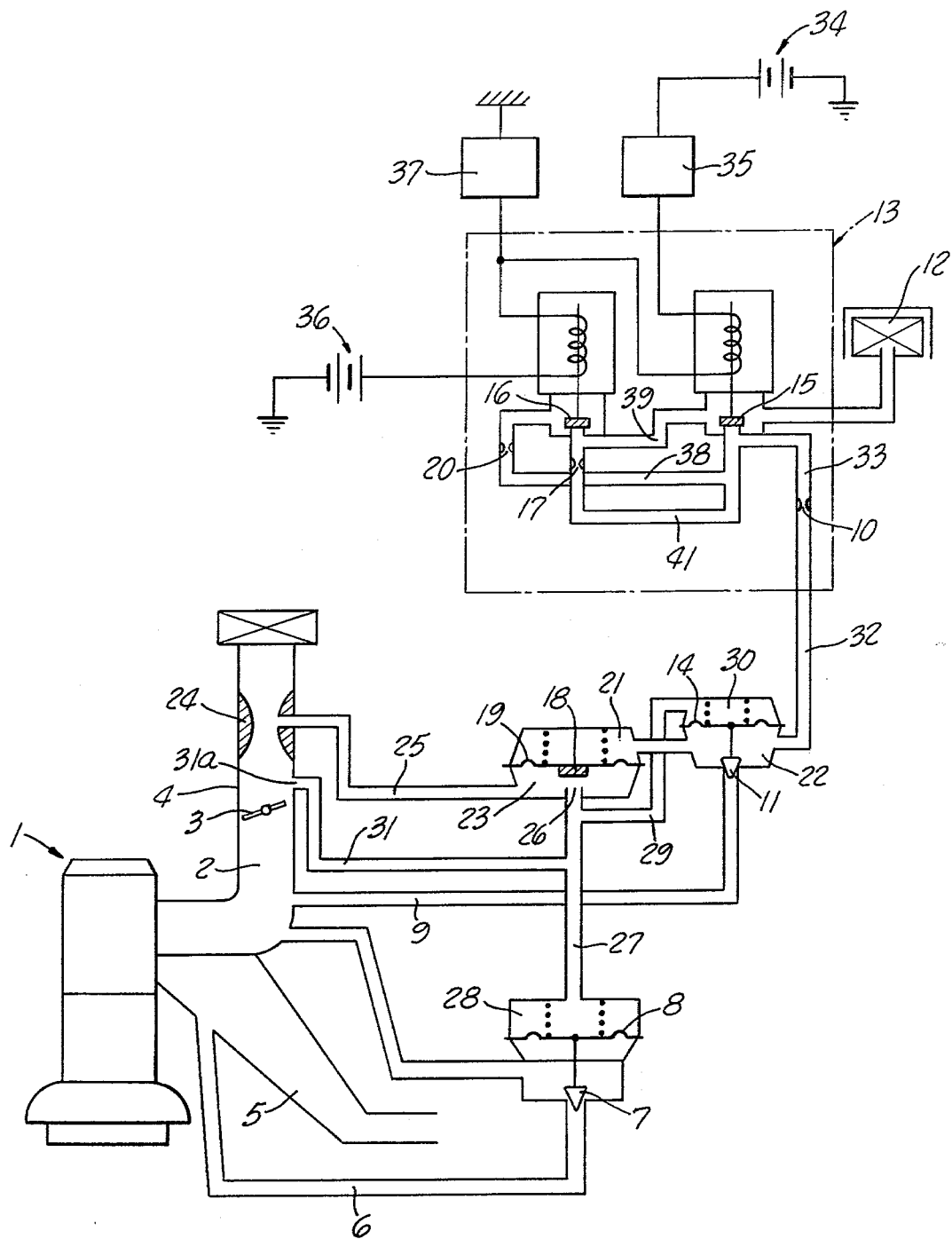

4,335,699

EXHAUST GAS RECIRCULATION SYSTEM

This invention relates to improvements over the copending application of Hiroyuki Nishimura Ser. No. 9,370 filed Feb. 5, 1979 and entitled "Internal Combustion Engine". In that application there is disclosed an internal combustion engine having an intake passage for delivering an air-fuel mixture into the engine and an exhaust passage for carrying exhaust gases from the engine, together with a recirculation passageway connecting the exhaust passage to the intake passage downstream from the throttle valve. A vacuum responsive control valve is provided in said recirculation passageway. An air introduction conduit is connected to the intake passage via a vacuum responsive control valve. A regulating valve is responsive to differential vacuum pressure in the engine intake passage and in the air introduction conduit downstream from a restriction.

This invention provides an additional system for selecting the effective size of the overall restriction in accordance with engine operating parameters such as, for example, driving speed and engine coolant temperature. When the engine coolant temperature is below 65° C., for example, the sensor causes the number and size of restrictions in the air conduit to reduce the air flow and thereby hold the exhaust recirculation rate to a low level. When the engine coolant temperature exceeds the predetermined value, a magnetic valve opens to change the total restriction in the air introduction conduit and thereby cause the recirculation control valve to permit a greater rate of flow of recirculating exhaust gas. When the driving speed exceeds about 20 km/h, for example, a sensor causes another magnetic valve to open and further change the total restriction in the air introduction conduit, causing further opening movement of the exhaust gas recirculation valve.

This invention makes it possible to prevent poor combustion which would otherwise take place if the high rate of exhaust gas recirculation were maintained when the engine is at a low temperature. Also, the invention makes it possible to avoid degradation in the driving performance due to a sudden reduction in engine speed when the exhaust gas recirculation rate is relatively high during a relatively low speed of the vehicle. When the engine temperature is above a predetermined level and when the driving speed is above a predetermined rate, a maximum of atmospheric air is introduced to increase the intensity of vacuum pressure operating the recirculation control valve, so that exhaust gas recirculation takes place at a relatively high flow rate. Thus, unwanted exhaust gas emissions can be reduced and the driving performance can be improved.

Other and more detailed objects and advantages will appear hereinafter.

The drawing is a schematic diagram showing a preferred embodiment of this invention.

Referring to the drawing, an internal combustion engine generally designated 1 has an intake passage 2 for an air-fuel mixture. A throttle valve 3 is positioned in a carburetor 4 connected to this passage 2. The engine is also provided with an exhaust passage 5 carrying exhaust gases away from the engine. A passageway 6 connects the exhaust passage 5 to the intake passage 2. A first control valve 7 controls the flow of exhaust gases from the exhaust passage 5 through the passageway 6 and back into the intake passage 2. This first control valve 7 has a vacuum responsive actuator with a diaphragm 8. An air conduit 9 connects the intake passage 2 with the atmosphere by way of a second control valve 11, first restriction 10, and to the atmospheric air intake filter 12 by one of several routes through the vacuum pressure modifier generally designated 13, as described below. The second control valve 11 is provided with a vacuum responsive actuator having a diaphragm 14.

A regulating valve 18 is provided for controlling the operation of the first control valve 7 and the second control valve 11. The regulating valve 18 has a diaphragm 19. A space 21 above the diaphragm 19 is connected to the space 22 below the diaphragm actuator 14 of the second control valve 11. The space 23 below the diaphragm 19 is connected to the venturi throat 24 in the carburetor 4, by way of tube 25. From this description it will be understood that relatively high vacuum pressure is applied to the space 23 to move the regulating valve 18 in a direction to close an open end 26 of the conduit 27 when the engine is running and the throttle valve 3 is open. A suction line 31 connects a vacuum outlet port 31a to a space 28 above the diaphragm 8 of the first control valve 7 and a space 30 above the diaphragm 14 of the second control valve 11, by way of conduits 27 and 29 respectively.

The conduit 32 forms a part of the air conduit 9 and extends from the space 22 to the vacuum pressure modifier and the first restriction 10. The conduit 33 also forms a part of the air conduit 9 and extends from the first restriction 10 to the seat for the magnetic valve 15, and to the seat for the magnetic valve 16 through the second restriction 17. When both magnetic valves 15 and 16 are closed, atmospheric air is drawn through connnecting conduit 39 through second restriction 17 and conduit 41, through conduit 33 and first restriction 10.

An energy source 34 supplies electrical energy to the speed sensor 35 for opening the magnetic valve 15. Another energy source 36 supplies electrical energy to the water temperature sensor 37 for opening the magnetic valve 16. When the magnetic valve 15 is open, atmospheric air is drawn through the filter 12 and through conduit 33 and first restriction 10 into the space 22 of the second control valve 11 and into the space 21 of the regulating valve 18. When the magnetic valve 16 is open, atmospheric air is drawn through third restriction 20 and conduit 38 into conduit 33 and through first restriction 10. Flow of atmospheric air from the filter 12 through the third restriction 20 and conduit 38 continues when the valves 15 or 16 are open.

In operation, vacuum pressure in the suction line 31 acts through conduit 27 in a direction to open the first control valve 7 and also acts through conduit 29 in a direction to open the second control valve 11. Increasing intensity of vacuum pressure in the conduit 27 opens the first control 7 to increase the rate of exhaust gas recirculation through recirculation passageway 6. When vacuum intensity in the conduit 27 is weakened by the regulating valve 18 which opens the open end 26, the first control valve 7 is moved toward closed position to reduce the rate of exhaust gas recirculation and also the second control valve 11 is moved toward closed position. When the open end 26 of the conduit 27 is closed by the regulating valve 18, the suction pressure in the conduit 27 is more intense so that the first control valve 7 and the second control valve 11 tend to move toward open position. The regulating valve 18 opens and closes the open end 26 of the conduit 27 in accordance with pressure difference in the spaces 21 and 23. The vacuum pressure in the space 21 is modified by flow of atmospheric air through conduit 32.

The rate of flow of atmospheric air through conduit 32 is controlled by the vacuum pressure modifier 13. The first restriction 10 is present at all times. It has a relatively large opening area, for example, on the order of 1.8 mm in diameter. The second restriction 17 may have a medium size opening area, for example, on the order of 1.2 mm in diameter, and the third restriction 20 may have a relatively small opening area, for example, on the order of 0.75 mm in diameter.

When both of the magnetic valves 15 and 16 are closed, atmospheric air passes through the middle size restriction 17 and the large restriction 10. When the temperature of the engine coolant exceeds a predetermined level, for example, 65° C., the sensor 37 acts to open the valve 16 and atmospheric air then flows through both restrictions 17 and 20 as well as through the restriction 10. When the driving speed exceeds a predetermined level, for example, 20 km/h, the speed sensor 35 acts to open the magnetic valve 15, and flow of atmospheric air then passes directly into conduit 33, with a small proportion passing through middle size restriction 17 to conduit 33 and first restriction 10. When both magnetic valves 15 and 16 are open, the major flow occurs directly into conduit 33 with minor amounts passing through both restrictions 17 and 20.

When the temperature of the engine coolant is low while the driving speed is low, both the sensors 35 and 37 turn off, and accordingly both magnetic valves 15 and 16 remain closed, and then the suction rate of air into the conduit 32 remains small. Consequently, the suction pressure within the space 21 is relatively high so that the regulating valve 18 is opened while the first control valve 7 remains slightly open or closed, resulting in a corresponding reduction in the flow rate of the recirculating exhaust gas through passageway 6. Thus, it is possible to prevent poor combustion which would take place if a great amount of exhaust gas were recirculated while the engine operated at a low temperature.

When the temperature of the engine cooling liquid increases so that the sensor 37 is activated, and if the driving speed is still low, the sensor 35 will not operate, and only the magnetic valve 16 opens. In this event the first restriction 10 and the second and third restrictions 17 and 20 come into action. The second and third restrictions then provide a total opening size, for example, on the order of 1.4 mm in diameter. As a result, the amount of air being introduced into the conduit 32 is increased so that a medium flow rate of recirculating exhaust gas is established. That is, according to this invention, it is possible to avoid degradation in the driving performance caused by sudden reduction in the engine speed while the rate of exhaust gas recirculation is relatively high.

When the magnetic valve 15 is also opened, with the increase in driving speed, the principal restriction to inflow of atmospheric air is provided by the first restriction 10 so that the recirculating exhaust gas flows at a relatively high rate through the passageway 6.

As described above, according to the present invention, the restrictions on introduction of atmospheric air into the conduit 32 are of different sizes, one or more of which are properly selected for action. Consequently, the flow rate of exhaust gas being recirculated can be controlled dpending upon the operating parameters of the engine. Thus, pollutants in the gases discharged into the atmosphere can be reduced, and the driving performance can be improved.

Having fully described our invention, it is to be understood that we are not to be limited to the details herein set forth but that our invention is of the full scope of the appended claims.

We claim:

1. In an internal combustion engine having an intake passage for delivering an air-fuel mixture into the engine, a throttle valve in the intake passage, and the engine having an exhaust passage for carrying exhaust gases from the engine, the improvement comprising, in combination: a recirculation passageway connecting said exhaust passage to said intake passage downstream from the throttle valve for recirculating exhaust gases into the engine, a first control valve in said passageway, an air conduit connecting said intake passage downstream from said throttle valve to an inlet for atmospheric air, a second control valve in said air conduit, each of said control valves having a vacuum responsive actuator, a regulating valve for controlling vacuum intensity in said actuators, said regulating valve being responsive to differential vacuum pressure between suction pressure in the intake passage and suction pressure in said air conduit upstream from said second control valve, a vacuum pressure modifier device including a restriction in the air conduit upstream from said second control valve, said vacuum pressure modifier device including a valve operatively interposed between the atmospheric air inlet and said first restriction, and means for operating the latter said valve in response to a sensor for an engine operating parameter.

2. The combination set forth in claim 1 in which the sensor responds to driving speed.

3. The combination set forth in claim 1 in which the sensor responds to engine coolant temperature.

4. The combination set forth in claim 1 in which the latter said valve is a magnetic valve.

5. In an internal combustion engine having an intake passage for delivering an air-fuel mixture into the engine, a throttle valve in the intake passage, and the engine having an exhaust passage for carrying exhaust gases from the engine, the improvement comprising, in combination: a recirculation passageway connecting said exhaust passage to said intake passage downstream from the throttle valve for recirculating exhaust gases into the engine, a first control valve in said passageway, an air conduit connecting said intake passage downstream from said throttle valve to an inlet for atmospheric air, a second control valve in said air conduit, each of said control valves having a vacuum responsive actuator, a regulating valve for controlling vacuum intensity in said actuators, said regulating valve being responsive to differential vacuum pressure between suction pressure in the intake passage and suction pressure in a portion of said air conduit upstream from said second control valve, a vacuum pressure modifier device operatively interposed in said portion of said air conduit, said vacuum pressure modifier device including at least one valve operable to open a restricted air passage to said portion of said air conduit, and means for operating the latter said valve in response to a sensor for an engine operating parameter.

6. The combination set forth in claim 5 in which two sensor operated valves are provided in said vacuum pressure modifier device, one responsive to engine coolant temperature and the other responsive to driving speed.

7. In an exhaust gas recirculation system including a vacuum pressure responsive type exhaust gas recirculation control valve provided in an exhaust gas recirculation passageway, the recirculation passageway providing communication between an exhaust passage and an intake passage of an internal combustion engine, the improvement comprising, in combination: an air conduit establishing communication from the atmosphere via restriction means to the engine intake passage, an air valve in said conduit acting in response to vacuum pressure, a regulating valve operative in response to vacuum pressure in said intake passage to control the vacuum pressure acting on said exhaust gas recirculation control valve, said restriction means comprising a plurality of individual restrictions, and means for selectively placing said individual restrictions in operation depending upon operating parameters of the engine.

* * * * *